United States Patent Office 2,776,895
Patented Jan. 8, 1957

2,776,895
PROCESS FOR PRODUCING PRINTING INKS

Jesse L. Biser, Chicago, Ill., assignor to The Roto Ink Corporation, Chicago, Ill., a corporation of Illinois No Drawing. Application October 10, 1952,
Serial No. 314,215

10 Claims. (Cl. 106—30)

The present invention relates to printing ink and particularly to an improved process of producing the same from rosin and similar resins, and certain metallic oxides, hydroxides and carbonates, together with pigments and solvents, without the necessity of cooking any of the resins in solvents, as has been customary in the past.

The printing inks are a specific form of coating composition which is applied to individual or continuous webs, usually of paper, by first being coated upon either type or various printings plates, and then being transferred either directly, or through the intermediation of an offset cylinder, to the paper.

One of the important inks in extremely extensive use at the present time is so-called rotogravure ink, which is primarily used for the printing of the picture and comic section of some Saturday and Sunday newspapers, as well as its very considerable use in magazines, mail order catalogs, wallpaper, food packages, and the like.

One of the primary prerequisites of a rotogravure ink is its extreme rapidity of drying and also freedom from strike-through so that it will become possible to print both sides of a sheet or web in one run through the press at high speed without blurring, offsetting, or interference of the printed matter on one side of the sheet with that on the other.

Usually rotogravure inks have consisted of solutions of various types of modified resins, and particularly metallic resinates, in a volatile solvent of relatively high degree of fugacity so that the drying could be accomplished very rapidly, particularly if the printed sheets were suitably heated and ventilated.

Some of the important ingredients in printing inks, and particularly those of the rotogravure type, are modified resins, for example, such as have been combined with certain quantities of calcium, zinc and other metals such as aluminum and magnesium.

In the early days of the art of printing by rotogravure the liquid media of the printing ink was made by dissolving fossil resins of the copal type, such as damar and "Pale Bold East India," in aromatic solvents such as benzene, xylene and toluene. Due, however, to the varying qualities of these fossil resins, such as contained dirt, etc., and also due to irregularity of supply, a manufactured resin was substituted as described in the following paragraph.

This method consisted of using an open varnish kettle in which was melted the resin, for example, ordinary wood rosin, and then introducing into it, at an elevated temperature, finely comminuted calcium oxide, calcium hydroxide, zinc oxide, or mixtures thereof. However, the temperature necessary to melt the rosin, and also the viscosity of the melted resin militates against the proper and complete combination of the metallic oxides, hydroxides, or even carbonates, with the rosin. Moreover, the operation requires the application of considerable amounts of heat and due to the fact that, as a result of the partial decomposition of the rosin, inflammable vapors are given off, the operation is fraught with considerable fire hazard, and the resulting fused resinate does not dissolve completely and has poor solvent release and limpidity.

A more recent and somewhat improved method has been to melt the raw rosin and then to thin it with an aliphatic petroleum hydrocarbon such as oleum spirits having a boiling range of from approximately 315° F. to 415° F. Then with agitation there is added calcium hydroxide or zinc oxide or some of both, either in the dry form or slurried with the above-mentioned solvent. Extraneous heat is applied during agitation of the solution until the acidic rosin, containing principally abietic acid, reacts with the above-mentioned metallic compounds, thereby forming the resinates of the respective metals. After complete solution has been attained the entire portion of the oleum spirits is then distilled off and condensed to be used again, and the resulting molten resin is then run into drums and allowed to cool before shipment to the ink manufacturer who then is obliged to put it back into solution before grinding it with selected pigments to obtain the colors desired.

One of the limitations of this last-above-mentioned method is that it is claimed that catalysts are necessary, and that the long and expensive operation is highly uneconomical.

One of the objects of the present invention is to provide a cold process for the manufacture of printing inks in which cooking of the rosin or resin is entirely avoided.

It is a further object of the present invention, simultaneously to form the metallic salts of resin or rosin acids in solution during and at the same time as the incorporation of the pigments so that the making of the inks can be carried out in a single unheated vessel.

Still a further object of the invention is to produce, for example, a rotogravure ink by the use of a ball, pebble or tube mill in which the entire operations, both chemical as well as mechanical, are carried out. Inasmuch as the operations are carried out in well-known equipment such as ball mills, pebble mills or tube mills, it is not deemed necessary to illustrate the same by a drawing.

Other important inks in extensive use at the present time are newspaper Spot and Process Typographic colored inks. The typographic method makes use of the transference of the ink to the paper from a relief etching in contradistinction to an intaglio or incised etching which is used in the aforementioned rotogravure method. Colored typographic inks have been used for many years almost exclusive for the printing of newspaper comic sections, but in more recent years such inks have grown into very considerable use in the printing of newspaper colored advertisements in addition to their use in the comic sections. Typographic newspaper inks dry or become more or less smudge-proof by absorption of the ink into the fibers of the paper.

A common process in their manufacture has been to cook a resin made by partially neutralizing an acidic rosin with calcium hydroxide and diluting or thinning while still hot with a heavy petroleum oil such as pale paraffin oil and with a lighter petroleum distillate comparable to a better grade fuel oil and have a distillation range of from say 400° F. to 515° F. Inks made from resins thus produced have always manifested some tendency to smudge, and particularly in humid weather, never dry completely.

Accordingly, another object of the present invention is to make newspaper typographic colored inks of a superior quality, examples of which are outlined hereinafter, and which have many superior qualities such as drying harder, more freedom from smudging due to faster solvent release, as well as finer pigment dispersion.

The fundamental principles involved in the present invention are the effecting of a reaction between an acidic rosin or resin, for example, wood rosin, and a metallic compound from the group consisting of the oxides, hydroxides or carbonates of zinc and of calcium, while the resinous material is present in solution in a suitable solvent, for example, an aliphatic hydrocarbon solvent, preferably a mixture of such hydrocarbon with a ketone, or an aromatic hydrocarbon such as toluol or xylol, or a lower alcohol such as ethyl or propyl alcohols, or mixtures of such solvents. For example, a ball mill may be charged with a suitable quantity of an acidic rosin, for instance, wood rosin, in dry lump condition, after which are added pigments of the desired shade, calcium hydroxide, zinc oxide, along with transparent inerts such as finely ground China clay, precipitated calcium carbonate, or some of both, all being in the dry form. Thereafter the ball mill is started and run for from 15 to 30 minutes, during which time the entire charge has been ground to an extremely fine and intimate mixture. There is then added a sufficient quantity of a hydrocarbon solvent, for instance, an aliphatic petroleum hydrocarbon having a boiling range of say from about 140° F. to about 500° F. or any intermediate fraction thereof. There may also be added a considerably smaller amount of a ketone such as di-methyl ketone, ethylmethyl ketone, or if desired, some lower aliphatic alcohol or an aromatic hydrocarbon such as toluene or xylene. Mixtures of these solvents may be used. The mill is then operated for from 3 to 5 hours, during which time the added solvents effect almost perfect wetting of the pigments and inerts, and with the intimate contacts of the revolving balls against each other and the interaction of all ingredients during perfect agitation the rosin begins to dissolve in the solvent and almost at the same time starts to react with the metallic compounds with the gradual formation of the resinates of zinc or calcium, or both, and concomitantly extremely fine dispersion of the pigments and transparent inerts is properly effected, as well as the reduction of the acid number of the rosin or resin substantially to zero.

As a result of the foregoing work done upon the materials the temperature, as a result of friction, will rise above that of the room, and may rise as high as 140° F. A suitable operating range may be from about 90° F. to about 150° F.

When this aforementioned grinding operation is completed a final amount of petroleum aliphatic hydrocarbon and mineral oil, such as pale paraffin oil, are added to the mill, which is then turned for say 15 to 30 minutes. This will effect a thinning action, and a smooth homogeneous system consisting of the finely dispersed pigments and inerts, suspended in the solution of the metallic resinates, results. This dispersion of the pigments and inerts is so complete as to prevent any settling of the pigments or inerts even after standing in a barrel for over a month without agitation. The contents of the mill, with the exception of the balls, pebbles or tubes, of course, is emptied, and if the proper proportions of material have been used, there will result an ink which is eminently suitable, for example, for rotogravure printing.

The color of the ink is of course entirely a matter of the pigments used, and in giving the subjoined example it should be understood that it is purely exemplificative and that the invention is not to be limited to the making of a red ink as will result from the carrying out of the specific example given.

EXAMPLE 1

A suitably sized ball mill is charged with:

20.0 parts by weight of resinated barium lithol toner
.2 part by weight of an oil-soluble red dye
4.8 parts by weight of titanium dioxide
84.6 parts by weight of "WW" rosin having an acid number of about 166
3.5 parts by weight of calcium hydroxide
4.5 parts by weight of zinc oxide The ball mill is then closed, and turned, for from 15 to 30 minutes, whereafter are added the following:

10.0 parts by weight of pale paraffin oil
10.0 parts by weight of acetone or a lower aliphatic alcohol, or an aromatic hydrocarbon, or mixtures thereof
40.0 parts by weight of an aliphatic hydrocarbon, having a distillation range from about 140° F. to about 315° F. or any desired fraction thereof These materials are thoroughly ground together for from four to five hours, the mill being then opened and an additional fifty parts of the same aliphatic hydrocarbon are added, whereafter the mill is closed and turned from 15 to 30 minutes to effect thinning, with the result that there will be produced a brilliant and very useful red ink, particularly of the kind that is used in color process rotogravure printing.

EXAMPLE 2

Instead of using the barium lithol toner, a milori blue may be used, possibly with small quantities of an oil soluble blue dye, the materials otherwise remaining the same.

EXAMPLE 3

To produce a yellow ink it is possible to use a pigment such as the well-known benzidine or chrome yellow, or mixtures thereof, and possibly a suitable oil-soluble yellow dye.

Such pigments or dyes are readily obtainable from manufacturers of colors and color-pigments, and hence need no further identification. The basic principle of the invention lies in the fact that it is not necessary in any way to heat the material; that is to say, that the addition of extraneous heat is not necessary.

EXAMPLE 4

*Newspaper typographic process red ink*

20.0 parts by weight resinated barium lithol toner
92.5 parts by weight of "WW" rosin having an acid number of about 166
3.7 parts by weight of calcium hydroxide
6.8 parts by weight of zinc oxide The ball mill is then closed and turned for from 15 to 30 minutes, whereafter are added the following:

50.0 parts by weight of pale paraffin oil
25.0 parts by weight of an aliphatic hydrocarbon having distillation range of from about 400° F. to about 515° F.

These materials are thoroughly ground together for from four to five hours, the mill then being opened and an additional 25 parts of the same aliphatic hydrocarbon are added, whereafter the mill is closed and turned for 15 to 30 minutes to effect thinning, with the result that there will be produced a brilliant and very useful red ink particularly of the kind used in newspaper Process and Spot color printing.

EXAMPLE 5

*Newspaper typorgaphic process blue ink*

Instead of using the barium lithol toner, a milori blue may be used with possible additions of either peacock blue or benzidine yellow if a greener shade of blue ink is desired.

EXAMPLE 6

*Newspaper typographic process yellow ink*

To produce a yellow ink it is possible to use a pigment such as the well-known benzidine yellow, either straight or mixed with light chrome yellow.

A modification of the above process comprises adding the pigment last, after first dry grinding the resin and metal compound until finely comminuted and then wet grinding the resulting mixture with any of the previously mentioned organic solvents from three to four hours. The pigment may then be added and the new mixture ground for about two hours without the introduction of extraneous heat, after which time the chemical reactions between the resin and the metal compounds as well as the dispersion of the pigments have substantially been completed.

It is quite remarkable how completely the metallic oxides, hydroxides or carbonates will react with the rosin acids when they are properly dispersed in the hereinabove-mentioned organic solvents, and which is of course due to superior agitation in a ball mill in contradistinction to agitation in a cooking vessel. The resulting resins are almost completely clear or at least if separated by evaporating the solvent, will be found to have but a very slight haze.

As a result of the operations of the present invention the cost and time of making greatly improved printing inks are very drastically reduced, which is therefore a very great economic and commercial advantage which stamps the present invention as having great economic value.

While rosin has been mentioned in specific examples, it will be evident that similar types of acidic resins such as copal, damar and the like may be used with substantially the same results, but with perhaps some modifications of the amounts of the calcium and zinc compounds, depending upon the acid number of the resins above-mentioned. As this is entirely within the scope of knowledge of those skilled in the art, no further description need be given.

In general, the amounts of calcium in the modified resins as produced by the above processes may usefully range from about 1% to 3% by weight, and that of the zinc from about 2% to about 6%, both on the elemental basis.

Accordingly I claim:

1. Process of producing printing ink and similar coating compositions which comprises grinding a pigment and a resin-reactive metal compound from the group consisting of the oxides, hydroxides and carbonates of calcium and of zinc, resin and an organic solvent in the absence of a catalyst and without introduction of extraneous heat.

2. Process of producing printing ink and similar coating compositions which comprises grinding a pigment and a resin-reactive metal compound selected from the group consisting of the oxides, hydroxides and carbonates of calcium and of zinc, and resin in a mill provided with loose, tumbling grinding elements in a hydrocarbon in the absence of a catalyst and without introduction of extraneous heat.

3. Process of producing printing ink and similar coating compositions which comprises grinding a resin in a mill provided with loose tumbling grinding elements together with a metal compound from the group consisting of the oxides, hydroxides and carbonates of calcium and of zinc until finely ground, then adding sufficient solvent from the group consisting of the aliphatic and aromatic hydrocarbons to dissolve the resin and continuing the wet grinding for from three to four hours, thereafter adding a pigment and continuing the grinding for about two hours without introduction of extraneous heat, after which time the chemical reactions between the resin and the metal compounds as well as the dispersion of the pigments have substantially completed themselves.

4. Process of producing printing ink which comprises grinding together in a mill provided with loose tumbling grinding elements, rosin, calcium hydroxide, zinc oxide, a pigment-filler, and a rosin solvent from the group consisting of the lower aliphatic alcohols, without the introduction of extraneous heat, until the reactions between the above-mentioned materials have completed themselves.

5. Process of producing printing ink which comprises the steps of reacting calcium hydroxide and zinc oxide with rosin and a solvent for the latter while grinding in a ball mill in the presence of sufficient insoluble pigment to produce a printing ink of the desired color.

6. Process of producing a printing ink which comprises the conjoint grinding in a ball mill of a pigment, rosin, calcium hydroxide, zinc oxide and an organic rosin solvent, starting the operation at room temperatures and without introduction of extraneous heat and continuing it until the ensuing reactions are substantially completed.

7. Process of producing a printing ink which comprises the conjoint grinding in a ball mill of a pigment, rosin, calcium hydroxide, zinc oxide and a petroleum hydrocarbon having a distillation characteristic within the range of from about 140° F. to about 500° F., acetone and toluene, starting the operation at room temperature and without introduction of extraneous heat.

8. In the process of making printing ink from a resinous material, the step of combining said resinous material with a metal compound from the group consisting of the oxides, hydroxides and carbonates of calcium and of zinc in a ball mill in the presence of sufficient resin solvent to dissolve both the resinous material and the resulting resinates with neither a catalyst nor the introduction of extraneous heat.

9. Process of producing printing ink which comprises grinding together in a mill provided with loose tumbling grinding elements, rosin, calcium hydroxide, zinc oxide, a pigment-filler and acetone, without the introduction of extraneous heat, until the reactions between the above-mentioned materials have completed themselves.

10. Process of making printing ink which comprises charging a rotary grinding mill provided with loose tumbling grinding elements at substantially room temperature with coloring matter, pigments, rosin, calcium hydroxide, zinc oxide, paraffin oil, an organic rosin solvent and an aliphatic hydrocarbon having a distillation range of from about 140° F. to about 315° F., and operating said mill for from about three to about five hours, until, as a result of the reaction between the calcium hydroxide, zinc oxide and rosin, the corresponding rosin salts have been formed and become dissolved in the liquid components of the mixture, and the pigments and coloring matter have become uniformly suspended in the resulting solution.

References Cited in the file of this patent

UNITED STATES PATENTS

| | | |
|---|---|---|
| 2,052,170 | Engelmann | Aug. 25, 1936 |
| 2,245,100 | Bernstein | June 10, 1941 |
| 2,353,991 | Boutwell | July 18, 1944 |
| 2,450,959 | Heinecke | Oct. 12, 1948 |
| 2,540,776 | Cadwell | Feb. 6, 1951 |

FOREIGN PATENTS

| | | |
|---|---|---|
| 592,470 | France | Aug. 3, 1925 |

OTHER REFERENCES

Pulp and Paper Ind. XVIII De Cew "Tech. Assoc. Papers" (1935), 166–167.

Faucett: "Paint Oil and Chem. Rev.," 107 (Feb. 19, 1944), pp. 9, 10, 34, and 35.